US 12,452,557 B2

(12) United States Patent
Hagihara

(10) Patent No.: US 12,452,557 B2
(45) Date of Patent: Oct. 21, 2025

(54) IMAGING DEVICE, SCOPE, AND ENDOSCOPE SYSTEM

(71) Applicant: OLYMPUS MEDICAL SYSTEMS CORP., Hachioji (JP)

(72) Inventor: Yoshio Hagihara, Nishitama-gun (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 110 days.

(21) Appl. No.: 18/411,402

(22) Filed: Jan. 12, 2024

(65) Prior Publication Data

US 2024/0155266 A1 May 9, 2024

Related U.S. Application Data

(63) Continuation of application No. PCT/JP2021/027142, filed on Jul. 20, 2021.

(51) Int. Cl.
*H04N 25/77* (2023.01)
*H04N 23/50* (2023.01)
*H04N 23/65* (2023.01)

(52) U.S. Cl.
CPC ........... *H04N 25/77* (2023.01); *H04N 23/555* (2023.01); *H04N 23/65* (2023.01)

(58) Field of Classification Search
CPC ...... H04N 25/77; H04N 23/555; H04N 23/06; H04N 25/709; A61B 1/051
See application file for complete search history.

(56) References Cited

U.S. PATENT DOCUMENTS

| 7,277,130 | B2* | 10/2007 | Korthout | H04N 25/766 |
| | | | | 348/E3.018 |
| 2017/0053957 | A1* | 2/2017 | Ueno | H04N 25/77 |
| 2018/0048790 | A1 | 2/2018 | Adachi | |
| 2018/0084211 | A1* | 3/2018 | Nishino | H04N 25/618 |
| 2021/0168287 | A1 | 6/2021 | Hagihara | |

FOREIGN PATENT DOCUMENTS

| JP | 2006-129127 A | 5/2006 |
| JP | 2015-159501 A | 9/2015 |
| JP | 6138406 B1 | 5/2017 |
| WO | 2017/068899 A1 | 4/2017 |
| WO | 2020/021747 A1 | 1/2020 |

OTHER PUBLICATIONS

International Search Report dated Oct. 12, 2021, issued in counterpart International Application No. PCT/JP2021/027142, with English Translation. (4 pages).

* cited by examiner

*Primary Examiner* — Nhan T Tran
(74) *Attorney, Agent, or Firm* — WHDA, LLP

(57) ABSTRACT

An imaging device includes a pixel and a voltage generation circuit. The pixel is configured to operate based on a power source voltage and a reference voltage that is lower than the power source voltage and is higher than or equal to a ground voltage. The voltage generation circuit is configured to generate a predetermined positive voltage that is higher than the reference voltage and is lower than the power source voltage. A transfer transistor of the pixel is formed on a well. The predetermined positive voltage is applied to the well. The transfer transistor is configured to operate based on the power source voltage and the reference voltage.

9 Claims, 9 Drawing Sheets

IMAGING DEVICE, SCOPE, AND ENDOSCOPE SYSTEM

The present application is a continuation application based on International Patent Application No. PCT/JP2021/027142 filed on Jul. 20, 2021, the content of which is incorporated herein by reference.

BACKGROUND OF THE INVENTION

Field of the Invention

The present invention relates to an imaging device, a scope, and an endoscope system.

DESCRIPTION OF RELATED ART

Physical-quantity detection semiconductor devices having sensors sensitive to externally input electromagnetic waves (light, radiation, etc.) are used in various fields. A physical quantity is converted into an electrical signal by a sensor. For example, a sensor in an imaging device is a pixel. In general, electrical signals of a reference level and a signal level are read from the sensor. For example, the reference level in the imaging device is a reset level.

As an example of the above-described imaging device, a complementary metal-oxide-semiconductor (CMOS) imager has been developed. In some cases, a negative voltage is used in addition to a power source voltage and a ground voltage in order to secure pixel characteristics of the CMOS imager. For example, the value of the power source voltage is 3.3 V, the value of the ground voltage is 0 V, and the value of the negative voltage is −1 V.

It is known that the pixel characteristics, for example, the characteristics of a dark current are improved by applying a negative voltage to a gate electrode of a transfer transistor or the like. In order to provide pixels of a CMOS imager with a negative voltage, a circuit that provides the negative voltage from the outside of the CMOS imager, a negative voltage generation circuit that generates the negative voltage in the CMOS imager, or the like is required, as disclosed in Japanese Unexamined Patent Application, First Publication No. 2006-129127.

A technique disclosed in Japanese Patent No. 6138406 offers an endoscope system that provides an imaging unit with a negative voltage. A pulse-signal-superimposing unit disposed in a main body of the endoscope system generates a pulse signal having the negative voltage. A separation unit and a pulse signal detection unit in a scope separate the pulse signal having the negative voltage into the negative voltage and a pulse signal. The imaging unit is driven by using the negative voltage and the pulse signal.

SUMMARY OF THE INVENTION

According to a first aspect of the present invention, an imaging device includes a pixel and a voltage generation circuit. The pixel is configured to operate based on a power source voltage and a reference voltage that is lower than the power source voltage and is higher than or equal to a ground voltage. The voltage generation circuit is configured to generate a predetermined positive voltage that is higher than the reference voltage and is lower than the power source voltage. The pixel includes a photodiode, a floating diffusion, and a transfer transistor. The photodiode is configured to generate an electric charge through photoelectric conversion. The floating diffusion is configured to store the electric charge generated by the photodiode. The transfer transistor is formed on a well and is configured to transfer the electric charge generated by the photodiode to the floating diffusion. The predetermined positive voltage is applied to the well. The transfer transistor is configured to operate based on the power source voltage and the predetermined positive voltage and is configured to operate based on the reference voltage and the predetermined positive voltage.

According to a second aspect of the present invention, in the first aspect, the pixel may further include a reset transistor, an amplification transistor, and a selection transistor. The reset transistor is formed on the well and is configured to reset the floating diffusion. The amplification transistor is formed on the well and is configured to generate a pixel signal by amplifying the electric charge transferred to the floating diffusion. The selection transistor is formed on the well and is configured to output the pixel signal to a signal line. The reset transistor, the amplification transistor, and the selection transistor may be configured to operate based on the power source voltage and the predetermined positive voltage and may be configured to operate based on the reference voltage and the predetermined positive voltage.

According to a third aspect of the present invention, in the first or second aspect, the reference voltage may be the ground voltage.

According to a fourth aspect of the present invention, in the second aspect, the imaging device may further include two or more of the pixels and a vertical selection circuit. The vertical selection circuit is configured to output the power source voltage and the reference voltage to the selection transistor of each of the two or more of the pixels.

According to a fifth aspect of the present invention, in the second aspect, the imaging device may include a first substrate in which the pixel is disposed and a second substrate stacked on the first substrate. The first substrate and the second substrate may be connected to each other by the signal line. The second substrate may include a voltage output circuit configured to output a voltage higher than or equal to the predetermined positive voltage to the signal line.

According to a sixth aspect of the present invention, in the fifth aspect, the voltage output circuit may be a cascade-type current source.

According to a seventh aspect of the present invention, in the fifth aspect, the voltage output circuit may be a diode.

According to an eighth aspect of the present invention, a scope to be inserted into a living body includes the imaging device disposed in the distal end of the scope.

According to a ninth aspect of the present invention, an endoscope system includes both a scope to be inserted into a living body and the imaging device disposed in the distal end of the scope.

DETAILED DESCRIPTION OF THE INVENTION

Hereinafter, embodiments of the present invention will be described with reference to the drawings.

First Embodiment

Figure 1:
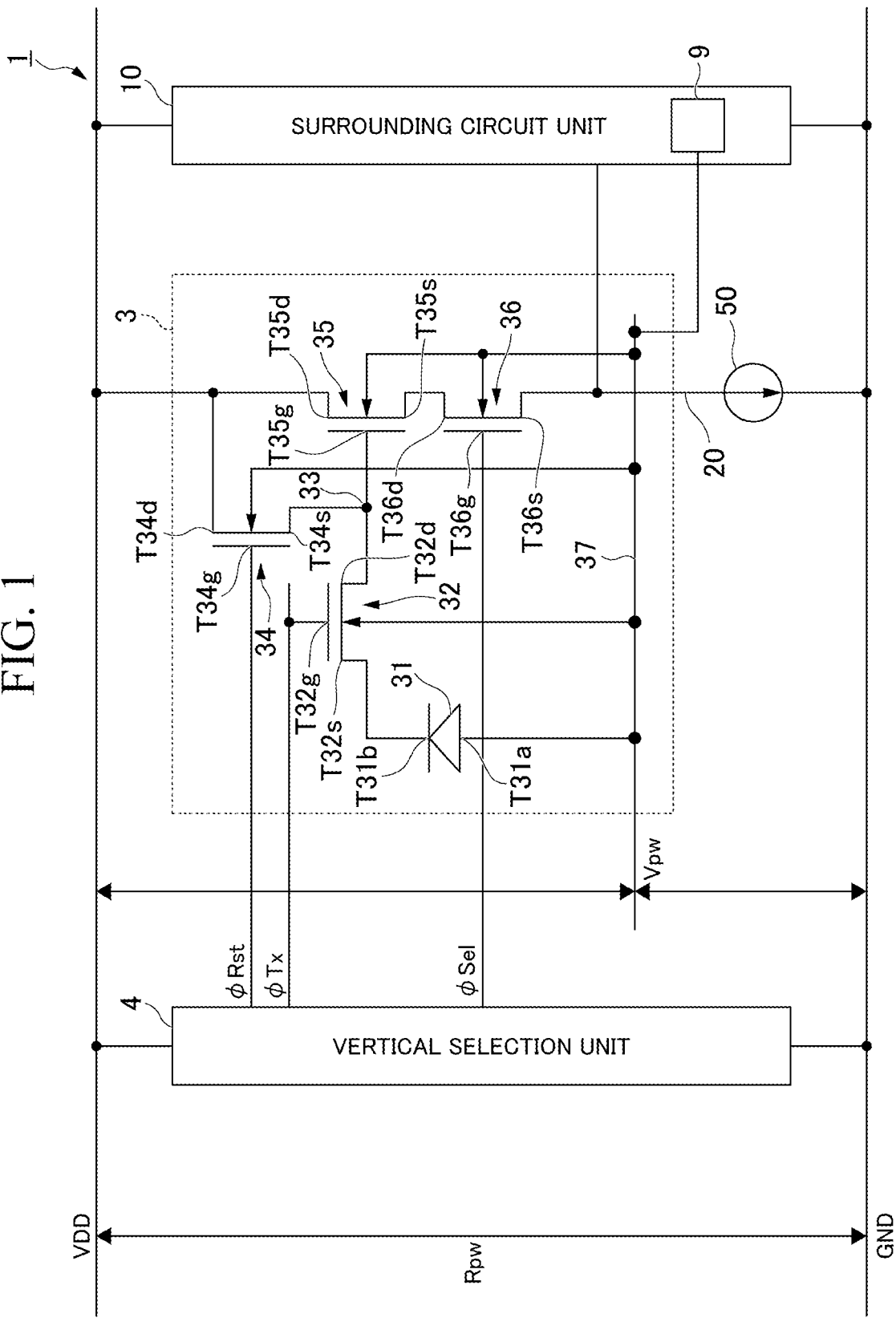
FIG. 1 is a circuit diagram showing a configuration of an imaging device according to a first embodiment of the present invention.

FIG. 1 shows a configuration of an imaging device 1 according to a first embodiment of the present invention. The imaging device 1 shown in FIG. 1 includes a pixel 3, a vertical selection unit 4, a surrounding circuit unit 10, and a current source 50. The pixel 3 includes a photoelectric conversion unit 31 photodiode), a transfer transistor 32, an electric charge storage portion 33 (floating diffusion), a reset transistor 34, an amplification transistor 35, a selection transistor 36, and a well 37. The surrounding circuit unit 10 includes a voltage generation circuit 9.

A schematic configuration of the imaging device 1 will be described. The pixel 3 operates based on a power source voltage VDD and a reference voltage. The power source voltage VDD is a positive voltage. The reference voltage is lower than the power source voltage VDD and is higher than or equal to a ground voltage GND. The voltage generation circuit 9 generates a predetermined positive voltage Vpw that is higher than the reference voltage and is lower than the power source voltage VDD. The photoelectric conversion unit 31 generates an electric charge through photoelectric conversion. The electric charge storage portion 33 stores the electric charge generated by the photoelectric conversion unit 31. The transfer transistor 32 is formed on the well 37 and transfers the electric charge generated by the photoelectric conversion unit 31 to the electric charge storage portion 33. The predetermined positive voltage Vpw is applied to the well 37. The transfer transistor 32 operates based on the power source voltage VDD and the predetermined positive voltage Vpw and operates based on the reference voltage and the predetermined positive voltage Vpw.

The reset transistor 34 is formed on the well 37 and resets the electric charge storage portion 33. The amplification transistor 35 is formed on the well 37 and generates a pixel signal by amplifying the electric charge transferred to the electric charge storage portion 33. The selection transistor 36 is formed on the well 37 and outputs the pixel signal to a vertical signal line 20. The reset transistor 34, the amplification transistor 35, and the selection transistor 36 operate based on the power source voltage VDD and the predetermined positive voltage Vpw and operate based on the reference voltage and the predetermined positive voltage Vpw.

A detailed configuration of the imaging device 1 will be described. Hereinafter, an example in which the reference voltage is the ground voltage GND will be described. In a case in which the imaging device 1 is used in an endoscope system, the reference voltage may be a voltage that occurs in accordance with a voltage on the surface of the body of a patient. For example, the value of the power source voltage VDD power source potential) is 4.3 V, the value of the ground voltage GND (ground potential) is 0 V, and the value of the positive voltage Vpw positive potential) is 1 V. The value of each voltage is not limited to this example. A power source voltage range Rpw of the imaging device 1 is higher than or equal to the ground voltage GND and is lower than or equal to the power source voltage VDD.

The vertical selection unit 4 outputs a control signal used for controlling the pixel 3 to the pixel 3. The surrounding circuit unit 10 includes a processing circuit that processes the pixel signal output from the pixel 3, a control circuit that controls the processing circuit, or the like. The pixel 3 is disposed in a pixel region. The vertical selection unit 4 and the surrounding circuit unit 10 are disposed in a surrounding circuit region different from the pixel region.

The current source 50 and the surrounding circuit unit 10 are connected to the vertical signal line 20. The voltage generation circuit 9 generates the positive voltage Vpw and outputs the positive voltage Vpw to the well 37. The ground voltage GND is provided to a well of each of the vertical selection unit 4, the surrounding circuit unit 10, and the current source 50 in order to reduce noise.

The vertical selection unit 4 and the surrounding circuit unit 10 operate at a voltage between the power source voltage VDD and the ground voltage GND. The vertical selection unit 4 outputs a control signal having the power source voltage VDD or the ground voltage GND to a gate terminal of each of the transfer transistor 32, the reset transistor 34, and the selection transistor 36 of the pixel 3. When the power source voltage VDD is output to each transistor, each transistor operates based on the power source voltage VDD and the positive voltage Vpw of the well 37. When the ground voltage GND is output to each transistor, each transistor operates based on the ground voltage GND and the positive voltage Vpw of the well 37.

When the ground voltage GND is seen by using the positive voltage Vpw of the well 37 as a reference, the ground voltage GND is seen as a negative voltage. By applying the ground voltage GND to the gate terminal of each transistor, similar effects to those in a case in which a negative voltage is applied to the gate terminal of each transistor are obtained.

By applying the ground voltage GND to the gate terminal of the transfer transistor 32, the noise in the photoelectric conversion unit 31 is restricted, and the amount of the electric charge stored in the photoelectric conversion unit 31 increases. By applying the ground voltage GND to the gate terminal of the reset transistor 34, the noise superimposed on the electric charge of the electric charge storage portion 33 is restricted in a period during which the pixel signal is read.

As described above, the positive voltage Vpw, which is higher than the ground voltage GND and is lower than the power source voltage VDD, is provided to the well 37 of the pixel 3. Therefore, the imaging device 1 need not receive a negative voltage from the outside of the imaging device 1. In addition, the imaging device 1 need not include a negative voltage generation circuit that requires a large capacitance element.

A detailed configuration of the pixel 3 will be described. Each transistor included in the pixel 3 is an NMOS transistor. Each transistor includes a source terminal, a drain terminal, and a gate terminal.

The photoelectric conversion unit 31 is a photodiode. The photoelectric conversion unit 31 includes a terminal T31a and a terminal T31b. The terminal T31a of the photoelectric conversion unit 31 is connected to the well 37. The positive voltage Vpw is input to the terminal T31a of the photoelectric conversion unit 31. The terminal T31b of the photoelectric conversion unit 31 is connected to the transfer transistor 32.

A source terminal T32s of the transfer transistor 32 is connected to the terminal T31b of the photoelectric conversion unit 31. A drain terminal T32d of the transfer transistor 32 is connected to the electric charge storage portion 33. A gate terminal T32g of the transfer transistor 32 is connected to the vertical selection unit 4. A transfer pulse φTx is output from the vertical selection unit 4 to the gate terminal T32g of the transfer transistor 32.

A drain terminal T34d of the reset transistor 34 is connected to a power source that outputs the power source voltage VDD. The power source voltage VDD is input to the drain terminal T34d of the reset transistor 34. A source terminal T34s of the reset transistor 34 is connected to the electric charge storage portion 33. A gate terminal T34g of the reset transistor 34 is connected to the vertical selection unit 4. A reset pulse φRst is output from the vertical selection unit 4 to the gate terminal T34g of the reset transistor 34.

A drain terminal T35d of the amplification transistor 35 is connected to the power source that outputs the power source voltage VDD. The power source voltage VDD is input to the drain terminal T35d of the amplification transistor 35. A source terminal T35s of the amplification transistor 35 is connected to the selection transistor 36. A gate terminal T35g of the amplification transistor 35 is connected to the electric charge storage portion 33.

A drain terminal T36d of the selection transistor 36 is connected to the source terminal T35s of the amplification transistor 35. A source terminal T36s of the selection transistor 36 is connected to the vertical signal line 20. A gate terminal T36g of the selection transistor 36 is connected to the vertical selection unit 4. A selection pulse φSel is output from the vertical selection unit 4 to the gate terminal T36g of the selection transistor 36.

Since the selection transistor 36 is disposed, two or more pixels 3 connected to the same vertical signal line 20 are easily separated into a selected pixel and a non-selected pixel. The selected pixel is a pixel 3 selected based on the selection pulse φSel. The non-selected pixel is a pixel 3 not selected based on the selection pulse φSel.

The terminal T31a of the photoelectric conversion unit 31 is connected to the well 37. A back gate of each of the transfer transistor 32, the reset transistor 34, the amplification transistor 35, and the selection transistor 36 is connected to the well 37. The well 37 is shared by the photoelectric conversion unit 31, the transfer transistor 32, the reset transistor 34, the amplification transistor 35, and the selection transistor 36. The positive voltage Vpw is output from the voltage generation circuit 9 to the well 37. The positive voltage Vpw is provided to the photoelectric conversion unit 31, the transfer transistor 32, the reset transistor 34, the amplification transistor 35, and the selection transistor 36.

The transfer transistor 32 is controlled based on the transfer pulse φTx output from the vertical selection unit 4. The reset transistor 34 is controlled based on the reset pulse φRst output from the vertical selection unit 4. The selection transistor 36 is controlled based on the selection pulse φSel output from the vertical selection unit 4.

The photoelectric conversion unit 31 generates an electric charge that is based on the amount of incident light. The transfer transistor 32 transfers the electric charge generated by the photoelectric conversion unit 31 to the electric charge storage portion 33. The electric charge storage portion 33 is a floating diffusion. The electric charge storage portion 33 stores the electric charge transferred by the transfer transistor 32. The reset transistor 34 resets the voltage of the electric charge storage portion 33 to a predetermined voltage. The amplification transistor 35 generates a pixel signal by amplifying a signal that is based on the voltage of the electric charge storage portion 33. The selection transistor 36 outputs the pixel signal to the vertical signal line 20. A first pixel signal having a reset level and a second pixel signal having a signal level are output from the pixel 3.

In the first embodiment, the voltage generation circuit 9 generates the predetermined positive voltage Vpw that is higher than the reference voltage and is lower than the power source voltage VDD. The positive voltage Vpw is applied to the well 37 of the pixel 3. Therefore, the imaging device 1 need not receive a negative voltage from the outside of the imaging device 1 and need not include a negative voltage generation circuit. The imaging device 1 is suitable for miniaturization.

Second Embodiment

Figure 2:
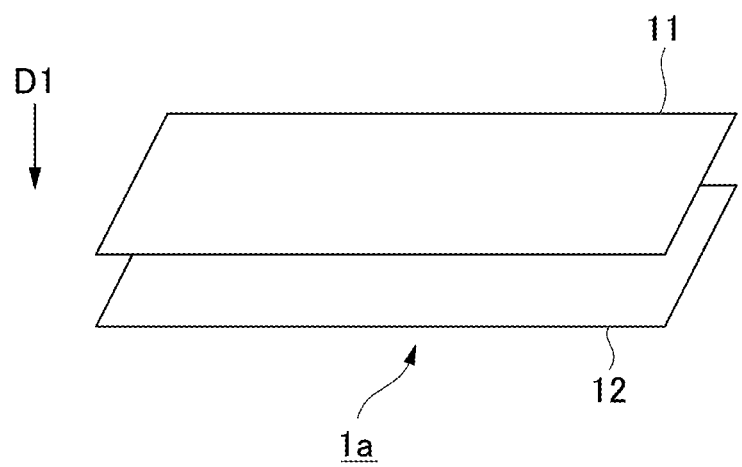
FIG. 2 is a diagram showing a configuration of an imaging device according to a second embodiment of the present invention.
Figure 3:
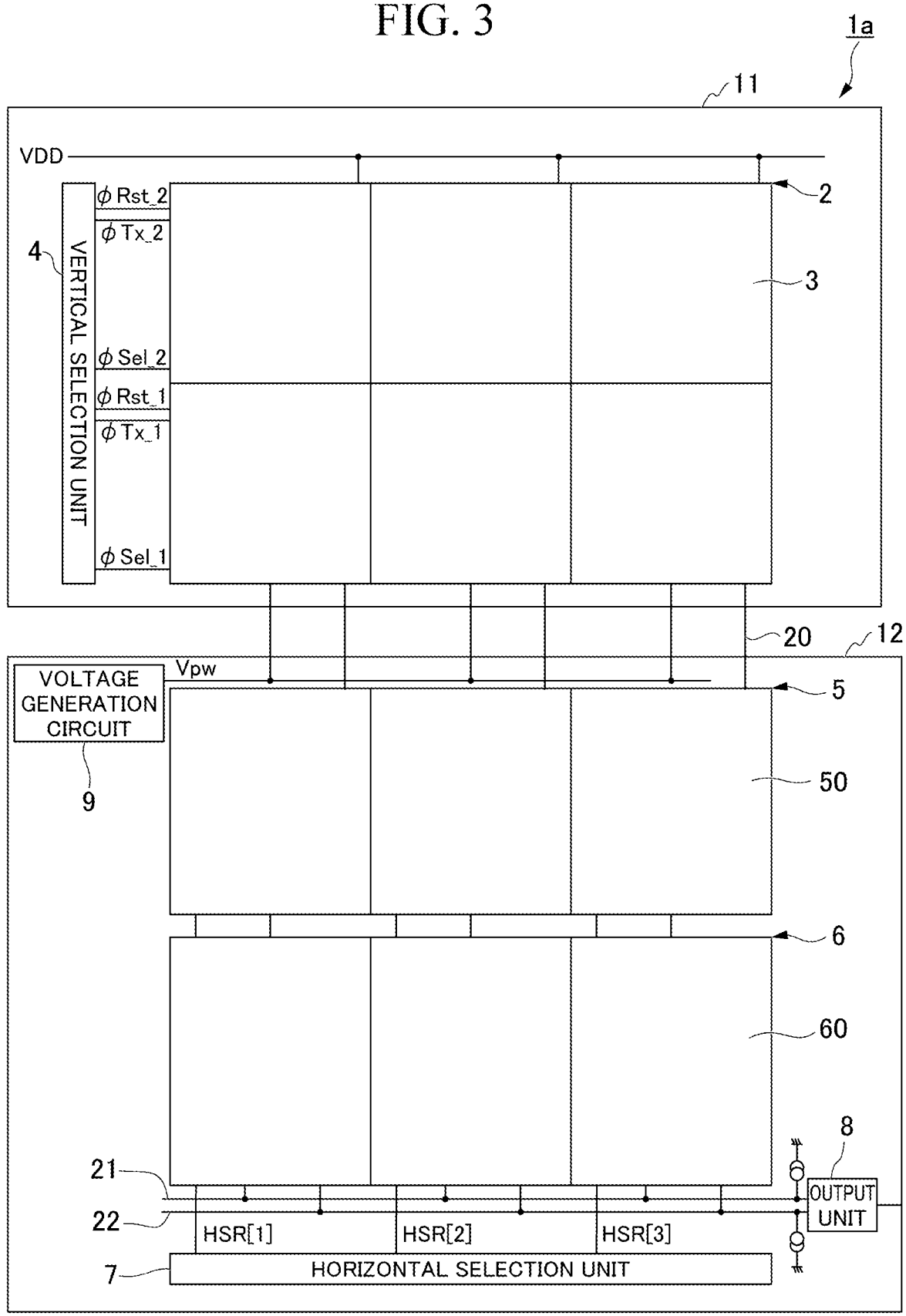
FIG. 3 is a block diagram showing a configuration of the imaging device according to the second embodiment of the present invention.

FIG. 2 and FIG. 3 show a configuration of an imaging device 1a according to a second embodiment of the present invention. The imaging device 1a shown in FIG. 2 and FIG. 3 includes a first substrate 11 and a second substrate 12 stacked on the first substrate 11. The second substrate 12 is stacked on the first substrate 11 in a stacking direction D1. The stacking direction D1 is a direction perpendicular to a main surface of the first substrate 11 or the second substrate 12. For example, the first substrate 11 and the second substrate 12 are connected to each other through Cu—Cu bonding or the like.

As shown in FIG. 3, the imaging device 1a includes an imaging unit 2, a vertical selection unit 4, a current source unit 5, a column circuit unit 6, a horizontal selection unit 7, an output unit 8, and a voltage generation circuit 9. The column circuit unit 6, the horizontal selection unit 7, the output unit 8, and the voltage generation circuit 9 correspond to the surrounding circuit unit 10 shown in FIG. 1. The imaging unit 2 and the vertical selection unit 4 are disposed in the first substrate 11. The current source unit 5, the column circuit unit 6, the horizontal selection unit 7, the output unit 8, and the voltage generation circuit 9 are disposed in the second substrate 12. The vertical selection unit 4 may be disposed in the second substrate 12.

The imaging unit 2 includes two or more pixels 3 disposed in a matrix shape. The two or more pixels 3 constitute an array having m rows and n columns. A number m and a number n are integers of two or more. The number of rows and the number of columns are not necessarily the same. In FIG. 3, an example in which the number of rows is two and the number of columns is three is shown. This is only an example and the present invention is not limited to this. Each pixel 3 outputs a first pixel signal having a reset level and a second pixel signal having a signal level. Each pixel 3 shown in FIG. 3 is the same as that shown in FIG. 1.

The vertical selection unit 4 selects pixels 3 disposed in the row direction in the array of the two or more pixels 3. The vertical selection unit 4 controls an operation of the selected pixels 3. The vertical selection unit 4 outputs control signals used for controlling the two or more pixels 3 for each row in the array of the two or more pixels 3. The vertical selection unit 4 outputs a transfer pulse, a reset pulse, and a selection pulse to each of the two or more pixels 3.

The transfer transistor 32 of the pixel 3 of the first row is controlled based on a transfer pulse φTx_1, and the transfer transistor 32 of the pixel 3 of the second row is controlled based on a transfer pulse φTx_2. The reset transistor 34 of the pixel 3 of the first row is controlled based on a reset pulse φRst_1, and the reset transistor 34 of the pixel 3 of the second row is controlled based on a reset pulse φRst_2. The selection transistor 36 of the pixel 3 of the first row is controlled based on a selection pulse and the selection transistor 36 of the pixel 3 of the second row is controlled based on a selection pulse φSel_2.

The vertical selection unit 4 outputs the power source voltage VDD and the ground voltage GND as a transfer pulse to the transfer transistor 32 of each of the two or more pixels 3. The vertical selection unit 4 outputs the power source voltage VDD and the ground voltage GND as a reset pulse to the reset transistor 34 of each of the two or more pixels 3. The vertical selection unit 4 outputs the power source voltage VDD and the ground voltage GND as a selection pulse to the selection transistor 36 of each of the two or more pixels 3.

The first substrate 11 and the second substrate 12 are connected to each other by a vertical signal line 20 extending in the vertical direction, that is, the column direction. The vertical signal line 20 is disposed for each column in the array of the two or more pixels 3. The vertical signal line 20 is connected to pixels 3 of each column. The vertical signal line 20 sequentially transfers the first pixel signal and the second pixel signal output from each pixel 3 to the second substrate 12.

The current source unit 5 includes two or more current sources 50. Each current source 50 is disposed for each column in the array of the two or more pixels 3. Each current source 50 is connected to the vertical signal line 20.

The column circuit unit 6 includes two or more column circuits 60. Each column circuit 60 is disposed for each column in the array of the two or more pixels 3. Each column circuit 60 is connected to the vertical signal line 20. Each column circuit 60 is electrically connected to the pixel 3 via the vertical signal line 20. Each column circuit 60 holds the first pixel signal and the second pixel signal output from the pixel 3.

Each column circuit 60 is connected to a first horizontal signal line 21 and a second horizontal signal line 22 extending in the horizontal direction, that is, the row direction. A selection pulse HSR[k] is output from the horizontal selection unit 7 to a column circuit 60 corresponding to a k-th column. The number k is any one of one, two, and three. The column circuit 60 selected based on the selection pulse HSR[k] outputs the first pixel signal to the first horizontal signal line 21 and outputs the second pixel signal to the second horizontal signal line 22.

One column circuit 60 may be disposed for two or more columns in the array of the two or more pixels 3, and the column circuit 60 may be used in the two or more columns in a time-division manner. Accordingly, the column circuit 60 has only to be disposed so as to correspond to one or more columns in the array of the two or more pixels 3.

The first horizontal signal line 21 and the second horizontal signal line 22 are connected to the output unit 8. The horizontal selection unit 7 sequentially outputs the selection pulse HSR[1], the selection pulse HSR[2], and the selection pulse HSR[3] to the column circuits 60, thus sequentially selecting the column circuits 60. The first pixel signal and the second pixel signal output from the column circuit 60 selected by the horizontal selection unit 7 are transferred to the output unit 8.

The output unit 8 generates an output signal based on the first pixel signal and the second pixel signal. For example, the output signal is the difference between the first pixel signal and the second pixel signal. The output unit 8 outputs the output signal to a subsequent-stage circuit.

The voltage generation circuit 9 generates a positive voltage Vpw that is higher than the ground voltage GND and is lower than the power source voltage VDD. The voltage generation circuit 9 outputs the positive voltage Vpw to the well 37.

Figure 4:
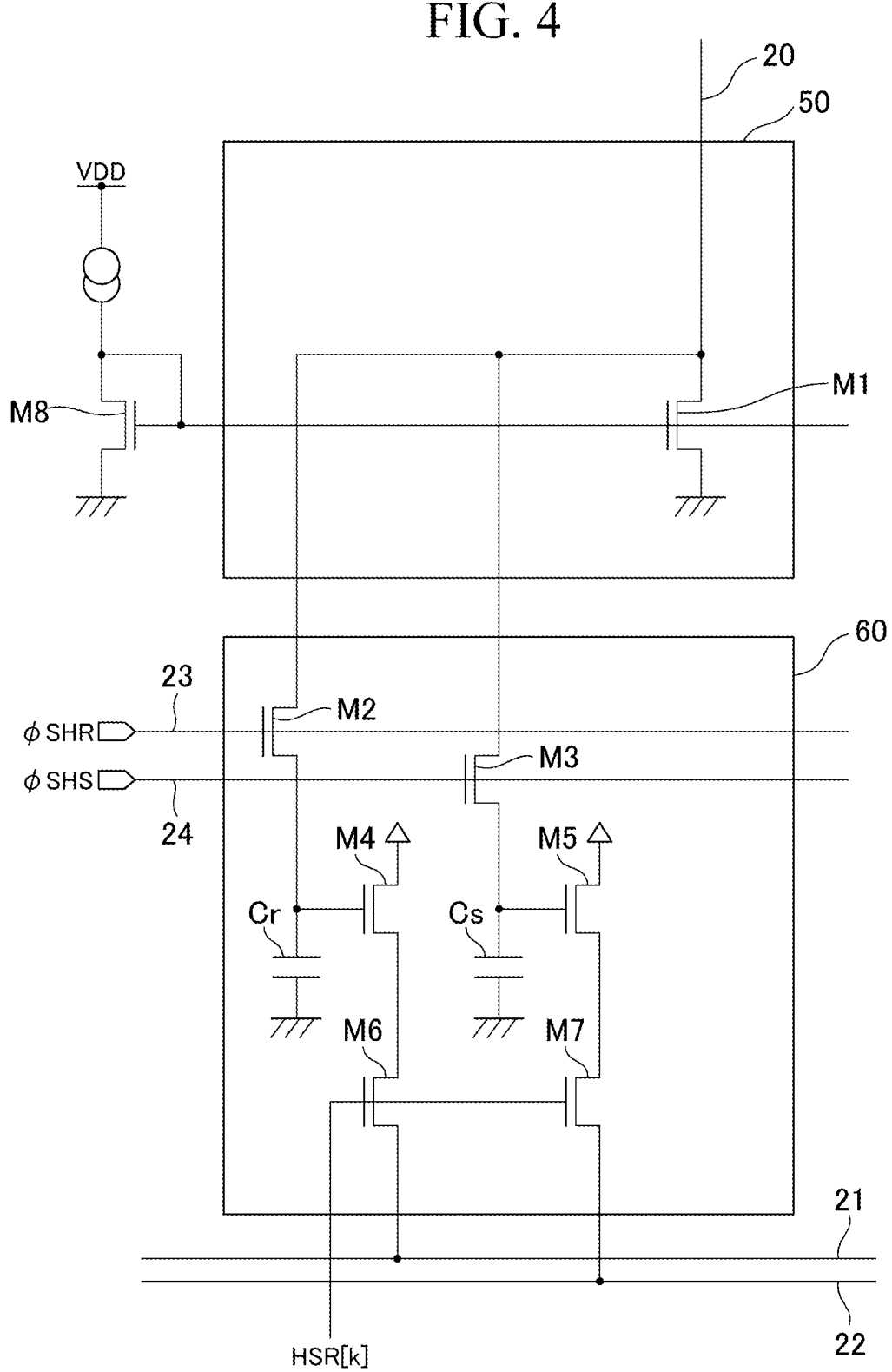
FIG. 4 is a circuit diagram showing a configuration of a current source and a column circuit in the imaging device according to the second embodiment of the present invention.

FIG. 4 shows a configuration of the current source 50 and the column circuit 60. The current source 50 shown in FIG. 4 includes a transistor M1. The column circuit 60 shown in FIG. 4 includes a sample transistor M2, a sample transistor M3, an amplification transistor M4, an amplification transistor M5, a column selection transistor M6, a column selection transistor M7, a capacitance element Cr, and a capacitance element Cs. In addition, a transistor M8 that generates a predetermined voltage based on the power source voltage VDD is disposed. Each transistor shown in FIG. 4 is an NMOS transistor. Each transistor shown in FIG. 4 includes a gate terminal, a source terminal, and a drain terminal.

The drain terminal of the transistor M1 is connected to the vertical signal line 20. The source terminal of the transistor M1 is connected to the ground. The gate terminal of the transistor M1 is connected to the gate terminal of the transistor M8. A predetermined voltage generated by the transistor M8 is input to the gate terminal of the transistor M1.

The drain terminal of the sample transistor M2 is connected to the vertical signal line 20. The source terminal of the sample transistor M2 is connected to the capacitance element Cr. The gate terminal of the sample transistor M2 is connected to a control signal line 23. The control signal line 23 extends in the row direction in the array of the plurality of pixels 3. The control signal line 23 transfers a sample-and-hold pulse φSHR.

The drain terminal of the sample transistor M3 is connected to the vertical signal line 20. The source terminal of the sample transistor M3 is connected to the capacitance element Cs. The gate terminal of the sample transistor M3 is connected to a control signal line 24. The control signal line 24 extends in the row direction in the array of the plurality of pixels 3. The control signal line 24 transfers a sample-and-hold pulse φSHS.

Each of the capacitance elements Cr and Cs includes a first terminal and a second terminal. The first terminal of the capacitance element Cr is connected to the source terminal of the sample transistor M2. The second terminal of the capacitance element Cr is connected to the ground. The first terminal of the capacitance element Cs is connected to the source terminal of the sample transistor M3. The second terminal of the capacitance element Cs is connected to the ground.

The power source voltage VDD is input to the drain terminal of the amplification transistor M4. The source terminal of the amplification transistor M4 is connected to the column selection transistor M6. The gate terminal of the amplification transistor M4 is connected to the first terminal of the capacitance element Cr.

The power source voltage VDD is input to the drain terminal of the amplification transistor M5. The source terminal of the amplification transistor M5 is connected to the column selection transistor M7. The gate terminal of the amplification transistor M5 is connected to the first terminal of the capacitance element Cs.

The drain terminal of the column selection transistor M6 is connected to the source terminal of the amplification transistor M4. The source terminal of the column selection transistor M6 is connected to the first horizontal signal line 21. The gate terminal of the column selection transistor M6 is connected to the horizontal selection unit 7.

The drain terminal of the column selection transistor M7 is connected to the source terminal of the amplification transistor M5. The source terminal of the column selection transistor M7 is connected to the second horizontal signal line 22. The gate terminal of the column selection transistor M7 is connected to the horizontal selection unit 7.

An operation of the sample transistor M2 is controlled based on the sample-and-hold pulse φSHR. An operation of the sample transistor M3 is controlled based on the sample-and-hold pulse φSHS. Operations of the column selection transistor M6 and the column selection transistor M7 are controlled based on the selection pulse HSR[k] output from the horizontal selection unit 7. A number k is any one of one, two, and three.

The transistor M1 functions as a current source. The sample transistor M2 samples the first pixel signal of the reset level output from the pixel 3 to the vertical signal line 20. The sample transistor M3 samples the second pixel signal of the signal level output from the pixel 3 to the vertical signal line 20. The capacitance element Cr holds the first pixel signal sampled by the sample transistor M2. The capacitance element Cs holds the second pixel signal sampled by the sample transistor M3. The capacitance element Cr and the capacitance element Cs are sample capacitors.

The amplification transistor M4 amplifies the first pixel signal of the reset level held in the capacitance element Cr. The amplification transistor M5 amplifies the second pixel signal of the signal level held in the capacitance element Cs.

The column selection transistor M6 outputs the first pixel signal amplified by the amplification transistor M4 to the first horizontal signal line 21. The column selection transistor M7 outputs the second pixel signal amplified by the amplification transistor M5 to the second horizontal signal line 22. The column selection transistor M6 and the column selection transistor M7 of the first column are controlled based on the selection pulse HSR[1]. The column selection transistor M6 and the column selection transistor M7 of the second column are controlled based on the selection pulse HSR[2]. The column selection transistor M6 and the column selection transistor M7 of the third column are controlled based on the selection pulse HSR[3].

Figure 5:
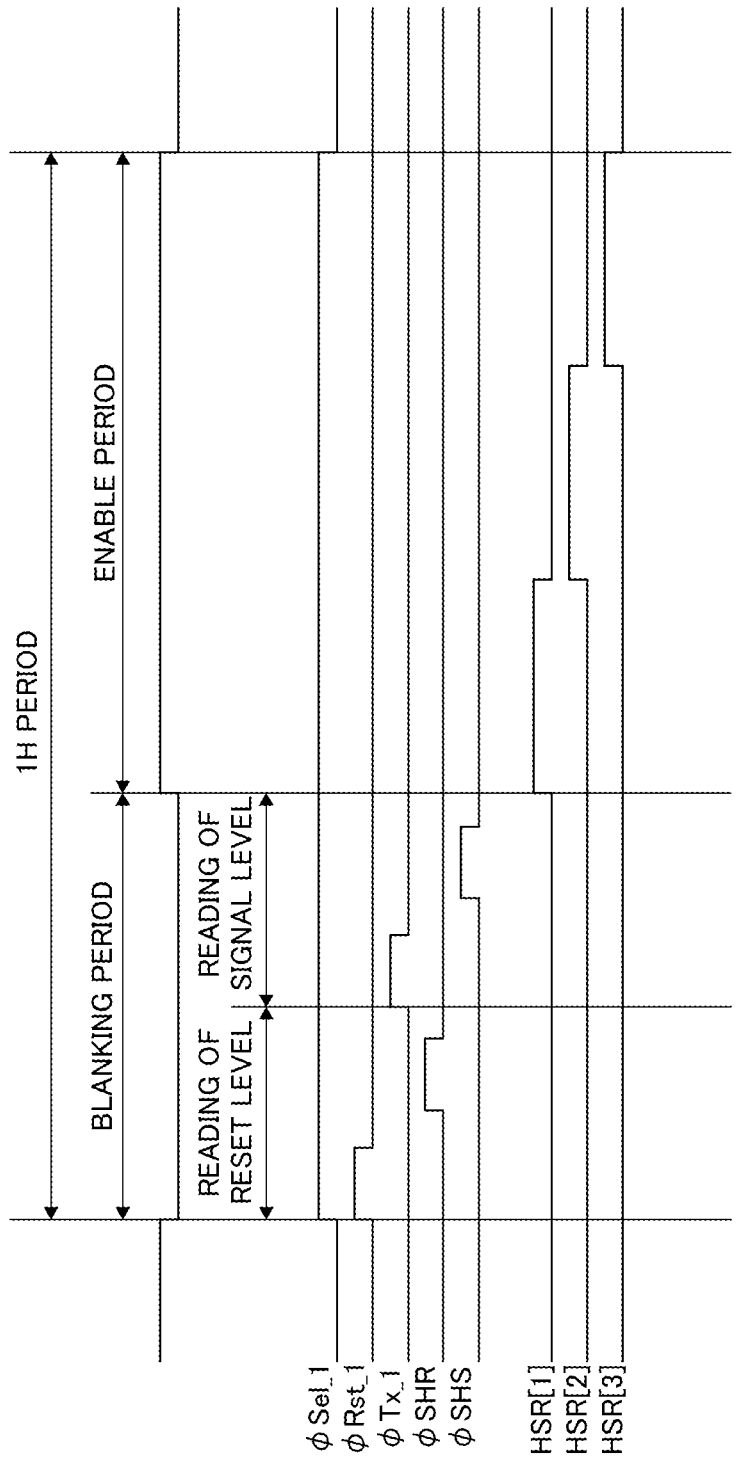
FIG. 5 is a timing chart showing an operation of the imaging device according to the second embodiment of the present invention.

An operation of the imaging device 1a will be described. FIG. 5 shows the operation of the imaging device 1a. Hereinafter, an operation in which the imaging device 1a reads a signal will be described. An example of an operation in which the imaging device 1a reads the pixel signals from the pixels 3 of the first row in the array of the two or more pixels 3 will be described. While the operation shown in FIG. 5 is executed, the voltage generation circuit 9 always outputs the positive voltage Vpw to the well 37.

In FIG. 5, waveforms of the selection pulse φSel_1, the reset pulse φRst_1, the transfer pulse φTx_1, the sample-and-hold pulse φSHR, the sample-and-hold pulse φSHS, the selection pulse HSR[1], the selection pulse HSR[2], and the selection pulse HSR[3] are shown. The horizontal direction in FIG. 5 indicates time and the vertical direction in FIG. 5 indicates a voltage.

The voltage of each pulse is a high level or a low level. The high level corresponds to the power source voltage VDD. The low level corresponds to the ground voltage GND.

A 1H period during which a pixel signal of one row is read includes a blanking period and an enable period. In the blanking period, the first pixel signal of the reset level and the second pixel signal of the signal level are read. Before the 1H period is started, the voltage of each of the selection pulse φSel_1, the reset pulse φRst_1, the transfer pulse φTx_1, the sample-and-hold pulse φSHR, the sample-and-hold pulse φSHS, the selection pulse HSR[1], the selection pulse HSR[2], and the selection pulse HSR[3] is the low level.

When the blanking period is started, the voltage of the selection pulse φSel_1 changes from the low level to the high level. Therefore, the state of the selection transistor 36 changes to the ON state. Due to this, the pixels 3 of the first row are selected.

(Reading of Reset Level)

The voltage of the reset pulse φRst_1 changes from the low level to the high level. Therefore, the state of the reset transistor 34 changes to the ON state. Due to this, the electric charge storage portion 33 is reset, and the first pixel signal of the reset level is output to the vertical signal line 20. Thereafter, the voltage of the reset pulse φRst_1 changes from the high level to the low level. Therefore, the state of the reset transistor 34 changes to the OFF state. Due to this, the reset transistor 34 stops resetting of the electric charge storage portion 33.

While the electric charge storage portion 33 is reset, the first pixel signal of the reset level is output to the vertical signal line 20. After the resetting of the electric charge storage portion 33 is stopped, the voltage of the sample-and-hold pulse φSHR changes from the low level to the high level. Due to this, the state of the sample transistor M2 changes to the ON state. Thereafter, the voltage of the sample-and-hold pulse φSHR changes from the high level to the low level. Therefore, the state of the sample transistor M2 changes to the OFF state. Due to this, the first pixel signal of the reset level is held in the capacitance element Cr.

(Reading of Signal Level)

After the voltage of the sample-and-hold pulse φSHR changes to the low level, the voltage of the transfer pulse φTx_1 changes from the low level to the high level. Therefore, the state of the transfer transistor 32 changes to the ON state. Due to this, the electric charge of the photoelectric conversion unit 31 is transferred to the electric charge storage portion 33, and the second pixel signal of the signal level is output to the vertical signal line 20. Thereafter, the voltage of the transfer pulse φTx_1 changes from the high level to the low level. Therefore, the state of the transfer transistor 32 changes to the OFF state. Due to this, the transfer transistor 32 stops the transfer of the electric charge.

After the voltage of the transfer pulse φTx_1 changes to the low level, the voltage of the sample-and-hold pulse φSHS changes from the low level to the high level. Therefore, the state of the sample transistor M3 changes to the ON state. Thereafter, the voltage of the sample-and-hold pulse φSHS changes from the high level to the low level. Therefore, the state of the sample transistor M3 changes to the OFF state. Due to this, the second pixel signal of the signal level is held in the capacitance element Cs.

When the blanking period is completed, the enable period is started. At this time, the voltage of the selection pulse HSR[1] changes from the low level to the high level. Therefore, the state of each of the column selection transistors M6 and M7 changes to the ON state. Due to this, the first pixel signal of the reset level of the pixel 3 in the first row and the first column is output to the first horizontal signal line 21. At the same time, the second pixel signal of the signal level of the pixel 3 in the first row and the first column is output to the second horizontal signal line 22.

Thereafter, the voltage of the selection pulse HSR[1] changes from the high level to the low level. Therefore, the state of each of the column selection transistors M6 and M7 changes to the OFF state. According to the above-described operation, the first pixel signal of the pixel 3 in the first row and the first column is read, and the second pixel signal of the pixel 3 in the first row and the first column is read.

After the voltage of the selection pulse HSR[1] changes to the low level, the voltage of the selection pulse HSR[2] changes from the low level to the high level. Due to this, as with the above-described operation, the first pixel signal of the pixel 3 in the first row and the second column is read, and the second pixel signal of the pixel 3 in the first row and the second column is read. Thereafter, the voltage of the selection pulse HSR[2] changes from the high level to the low level.

After the voltage of the selection pulse HSR[2] changes to the low level, the voltage of the selection pulse HSR[3] changes from the low level to the high level. Due to this, as with the above-described operation, the first pixel signal of the pixel 3 in the first row and the third column is read, and the second pixel signal of the pixel 3 in the first row and the third column is read. Thereafter, the voltage of the selection pulse HSR[3] changes from the high level to the low level.

At the same time as the voltage of the selection pulse HSR[3] changes to the low level, the voltage of the selection pulse φSel_1 changes from the high level to the low level. Therefore, the state of the selection transistor 36 changes to the OFF state. Due to this, the selection of the pixels 3 of the first row is canceled, and the operation in which the pixel signals are read from the pixels 3 of the first row is completed. Following the operation shown in FIG. 5, the imaging device 1a reads the pixel signals from the pixels 3 of the second row. This operation is similar to that shown in FIG. 5. An imaging device according to each aspect of the present invention has only to include a configuration corresponding to each of the imaging unit 2 and the voltage generation circuit 9.

The imaging device 1a according to the second embodiment includes the voltage generation circuit 9. Therefore, the imaging device 1a need not receive a negative voltage from the outside of the imaging device 1a or include a negative voltage generation circuit. The imaging device 1a is suitable for miniaturization.

The imaging device 1a includes the two or more pixels 3 and the vertical selection unit 4 (vertical selection circuit). The vertical selection unit 4 outputs the power source voltage VDD and the ground voltage GND to the selection transistor 36 of each of the two or more pixels 3. Therefore, the pixels 3 are easily controlled.

Third Embodiment

Figure 6:
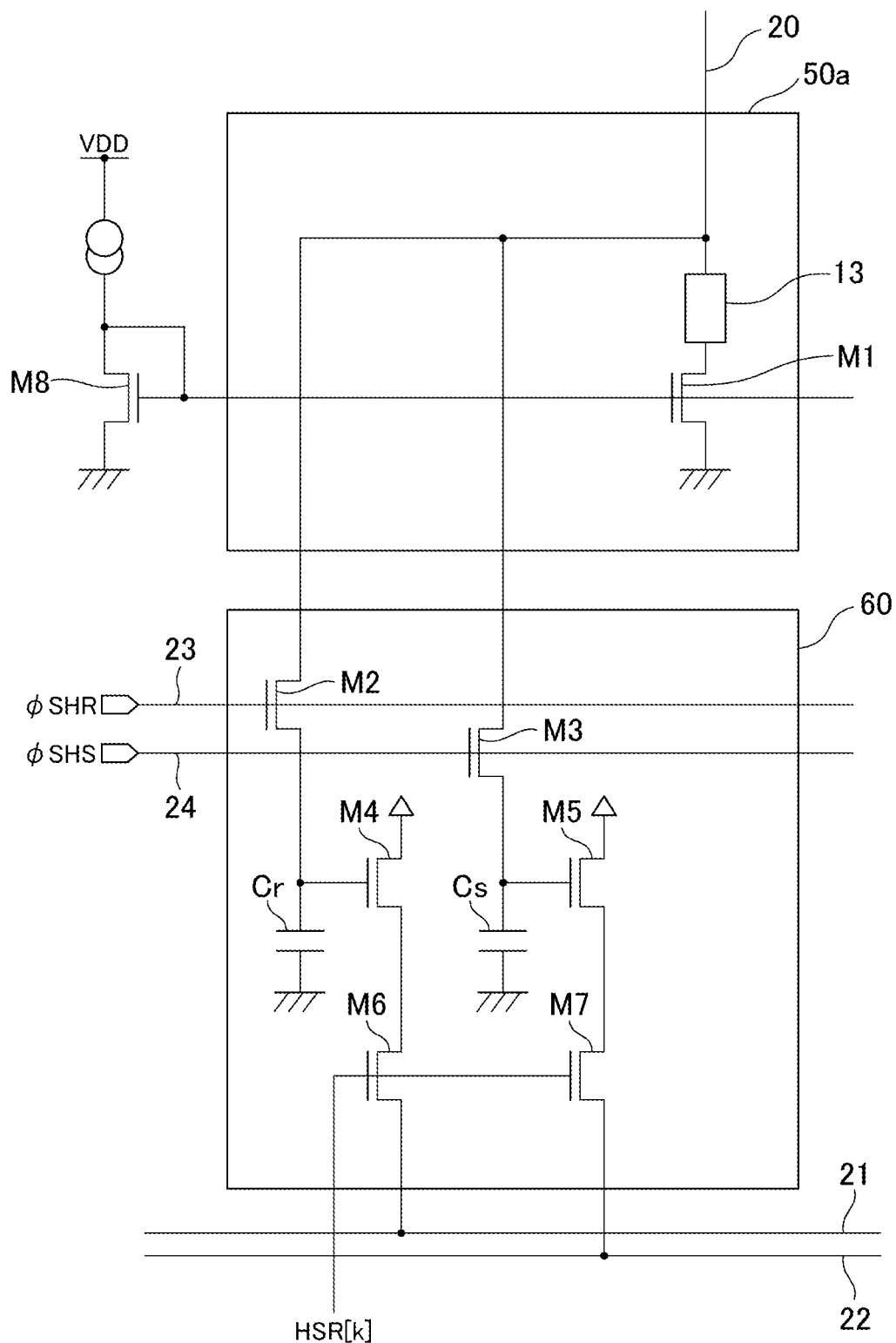
FIG. 6 is a circuit diagram showing a configuration of a current source and a column circuit in an imaging device according to a third embodiment of the present invention.

A third embodiment of the present invention will be described. FIG. 6 shows a configuration of a current source 50a and a column circuit 60 in the third embodiment. The current source 50 shown in FIG. 4 is changed to the current source 50a shown in FIG. 6. The same parts as those shown in FIG. 4 will not be described.

The current source 50a shown in FIG. 6 includes a transistor M1 and a voltage output circuit 13. The voltage output circuit 13 is connected to the vertical signal line and the transistor M1. The voltage output circuit 13 outputs a voltage higher than or equal to the positive voltage Vpw generated by the voltage generation circuit 9 to the vertical signal line 20.

Figure 7:
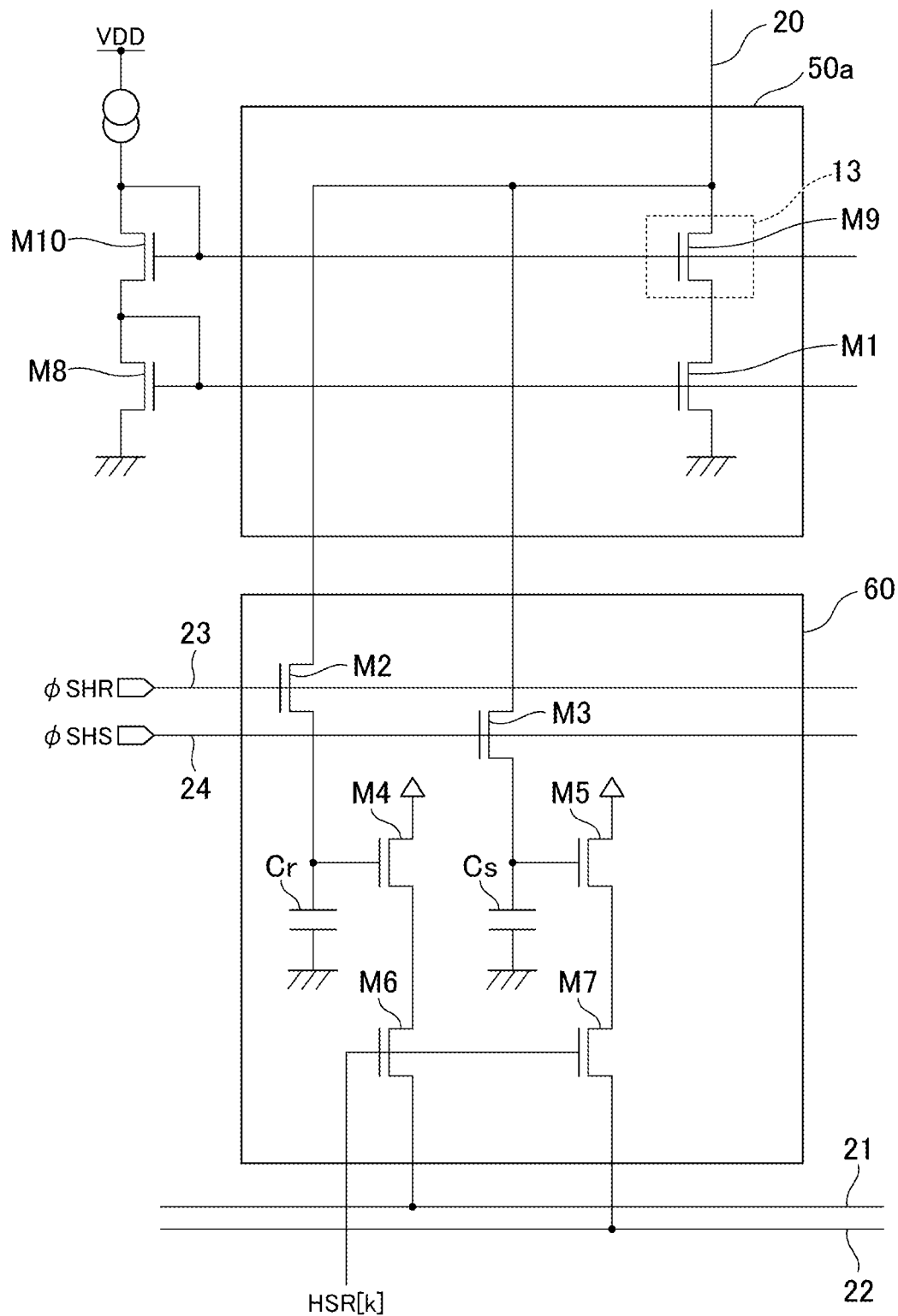
FIG. 7 is a circuit diagram showing a configuration of the current source and the column circuit in the imaging device according to the third embodiment of the present invention.

FIG. 7 shows a first example of the voltage output circuit 13. The voltage output circuit 13 includes a transistor M9. A transistor M10 that generates a predetermined voltage based on the power source voltage VDD is disposed.

A drain terminal of the transistor M9 is connected to the vertical signal line 20. A source terminal of the transistor M9 is connected to the drain terminal of the transistor M1. A gate terminal of the transistor M9 is connected to a gate terminal of the transistor M10. The predetermined voltage generated by the transistor M10 is input to the gate terminal of the transistor M9. The transistor M9 and the transistor M1 are connected in series and constitute a cascade-type current source. The sum of the drain-source voltage of the transistor M9 and the drain-source voltage of the transistor M1 is output to the vertical signal line 20. The transistor M9 applies a voltage higher than or equal to the positive voltage Vpw to the vertical signal line 20.

Figure 8:
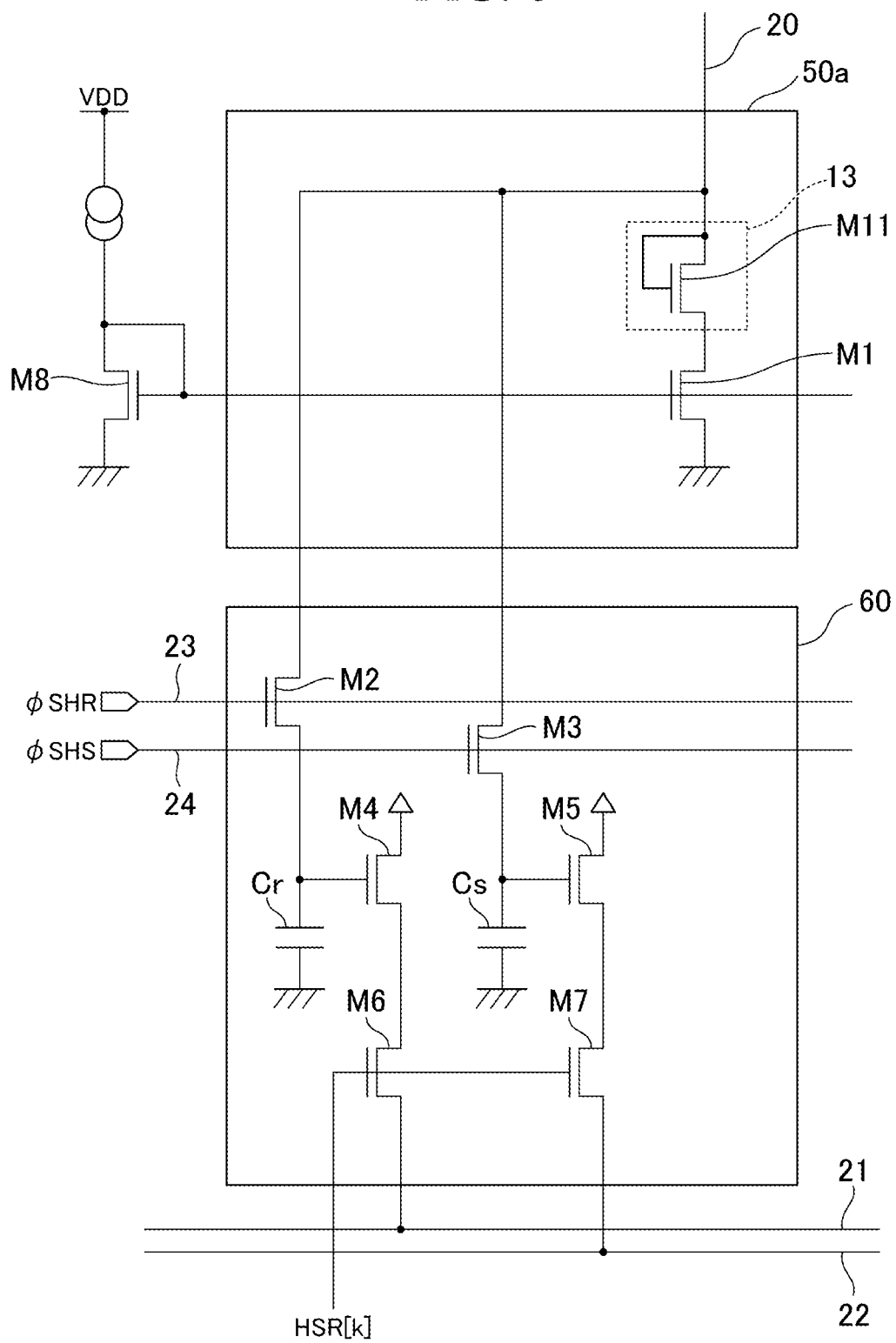
FIG. 8 is a circuit diagram showing a configuration of the current source and the column circuit in the imaging device according to the third embodiment of the present invention.

FIG. 8 shows a second example of the voltage output circuit 13. The voltage output circuit 13 includes a transistor M11 that functions as a diode.

A drain terminal of the transistor M11 is connected to the vertical signal line 20. A source terminal of the transistor M11 is connected to the drain terminal of the transistor M1. A gate terminal of the transistor M11 is connected to the drain terminal of the transistor M11. The voltage of the drain terminal of the transistor M11 is higher than that of the source terminal of the transistor M11. The sum of the drain-source voltage of the transistor M11 and the drain-source voltage of the transistor M1 is output to the vertical signal line 20. The transistor M11 applies a voltage higher than or equal to the positive voltage Vpw to the vertical signal line 20.

The ground voltage GND is applied to the gate terminal T36g of the selection transistor 36 of the pixel 3 that is not selected by the vertical selection unit 4. At this time, the positive voltage Vpw is applied to the well 37. When the voltage of the vertical signal line 20 is lower than the positive voltage Vpw, the state of the selection transistor 36 of the pixel 3 that is not selected by the vertical selection unit 4 may become the ON state. Since the voltage output circuit 13 applies the voltage higher than or equal to the positive voltage Vpw to the vertical signal line 20, the state of the selection transistor 36 of the pixel 3 that is not selected by the vertical selection unit 4 reliably becomes the OFF state.

The imaging device 1a according to the third embodiment includes the first substrate 11 in which the pixels 3 are disposed and the second substrate 12 stacked on the first substrate 11. The first substrate 11 and the second substrate 12 are connected to each other by the vertical signal line 20. The second substrate 12 includes the voltage output circuit 13 that outputs a voltage higher than or equal to the positive voltage Vpw to the vertical signal line 20.

In the third embodiment, the voltage output circuit 13 outputs a voltage higher than or equal to the positive voltage Vpw to the vertical signal line 20. Therefore, the imaging device 1a can reliably restrict an influence of the pixel 3 that is not selected by the vertical selection unit 4.

In the first example shown in FIG. 7, the voltage output circuit 13 is a cascade-type current source. In the second example shown in FIG. 8, the voltage output circuit 13 is a diode. Therefore, the voltage output circuit 13 can be easily constituted.

Fourth Embodiment

Figure 9:
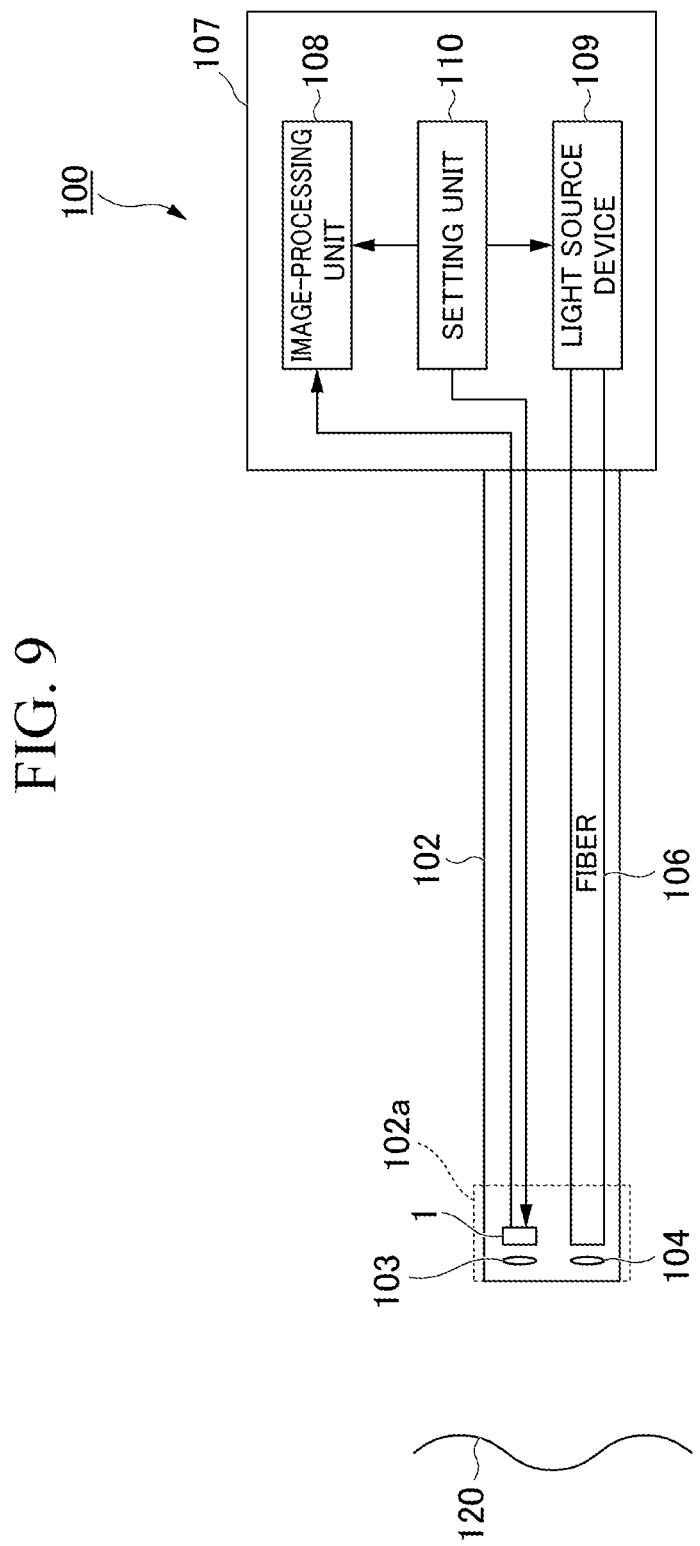
FIG. 9 is a block diagram showing a configuration of an endoscope system according to a fourth embodiment of the present invention.

FIG. 9 shows a configuration of an endoscope system 100 according to a fourth embodiment of the present invention. The endoscope system 100 includes an imaging device according to any one of the first to third embodiments. The endoscope system 100 shown in FIG. 9 includes a scope 102 and a housing 107. The scope 102 includes the imaging device 1 shown in FIG. 1, a lens 103, a lens 104, and a fiber 106. The imaging device 1, the lens 103, and the lens 104 are disposed at a distal end part 102a of the scope 102. The housing 107 includes an image-processing unit 108, a light source device 109, and a setting unit 110.

The lens 103 forms an image of reflected light from a subject 120 on the imaging device 1. The fiber 106 transfers illumination light with which the subject 120 is irradiated. The lens 104 irradiates the subject 120 with the illumination light transferred by the fiber 106. The light source device 109 includes a light source that generates the illumination light with which the subject 120 is irradiated. The image-processing unit 108 generates a captured image by performing predetermined processing on a signal output from the imaging device 1. The setting unit 110 controls an imaging mode of the endoscope system 100.

The configuration of the endoscope system 100 is not limited to the above-described configuration. An endoscope system according to each aspect of the present invention need not include a configuration corresponding to at least one of the lens 103, the lens 104, the fiber 106, the image-processing unit 108, the light source device 109, and the setting unit 110.

As described above, the endoscope system 100 includes the scope 102 to be inserted into a living body and the imaging device 1. The imaging device 1 is disposed in the distal end part 102a of the scope 102. The imaging device 1a shown in FIG. 3 may be used instead of the imaging device 1.

In the endoscope system 100 according to the fourth embodiment, the imaging device 1 is suitable for miniaturization.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging device, comprising:
    a pixel configured to operate based on a power source voltage and a reference voltage that is lower than the power source voltage and is higher than or equal to a ground voltage; and
    a voltage generation circuit configured to generate a predetermined positive voltage that is higher than the reference voltage and is lower than the power source voltage,
    wherein the pixel includes:
        a photodiode configured to generate an electric charge through photoelectric conversion;
        a floating diffusion configured to store the electric charge generated by the photodiode; and
        a transfer transistor that is formed on a well and is configured to transfer the electric charge generated by the photodiode to the floating diffusion,
    wherein the predetermined positive voltage is applied to the well, and
    wherein the transfer transistor is configured to operate based on the power source voltage and the reference voltage.

2. The imaging device according to claim 1,
    wherein the pixel includes:
        a reset transistor that is formed on the well and is configured to reset the floating diffusion;
        an amplification transistor that is formed on the well and is configured to generate a pixel signal by amplifying the electric charge transferred to the floating diffusion; and
        a selection transistor that is formed on the well and is configured to output the pixel signal to a signal line, and
    wherein the reset transistor, the amplification transistor, and the selection transistor are configured to operate based on the power source voltage and the reference voltage.

3. The imaging device according to claim 1,
    wherein the reference voltage is the ground voltage.

4. The imaging device according to claim 2, further comprising:
    two or more of the pixels; and
    a vertical selection circuit configured to output the power source voltage and the reference voltage to the selection transistor of each of the two or more of the pixels.

5. The imaging device according to claim 2, comprising:
    a first substrate in which the pixel is disposed; and
    a second substrate stacked on the first substrate,
    wherein the first substrate and the second substrate are connected to each other by the signal line, and
    wherein the second substrate includes a voltage output circuit configured to output a voltage higher than or equal to the predetermined positive voltage to the signal line.

6. The imaging device according to claim 5,
    wherein the voltage output circuit is a cascade-type current source.

7. The imaging device according to claim 5,
    wherein the voltage output circuit is a diode.

8. A scope to be inserted into a living body, the scope comprising the imaging device according to claim 1,
    wherein the imaging device is disposed in a distal end of the scope.

9. An endoscope system, comprising:
    a scope to be inserted into a living body; and
    the imaging device according to claim 1,
    wherein the imaging device is disposed in a distal end of the scope.

* * * * *